United States Patent
Li

(10) Patent No.: US 12,049,558 B2
(45) Date of Patent: Jul. 30, 2024

(54) OXYGEN SCAVENGING COMPOSITIONS, ARTICLES CONTAINING SAME, AND METHODS OF THEIR USE

(71) Applicant: Plastipak Packaging, Inc., Plymouth, MI (US)

(72) Inventor: Shenshen Li, Park Ridge, IL (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 15/581,428

(22) Filed: Apr. 28, 2017

(65) Prior Publication Data

US 2017/0313875 A1 Nov. 2, 2017

Related U.S. Application Data

(60) Provisional application No. 62/328,788, filed on Apr. 28, 2016.

(51) Int. Cl.
   C08L 67/02 (2006.01)
   B65D 81/26 (2006.01)
   C08L 9/00 (2006.01)

(52) U.S. Cl.
   CPC .......... C08L 67/02 (2013.01); B65D 81/266 (2013.01); C08L 9/00 (2013.01)

(58) Field of Classification Search
   CPC . C08L 9/00; C08L 67/02; C08L 77/06; B65D 81/266; B65D 81/26; B29C 47/00; B29C 43/00
   See application file for complete search history.

(56) References Cited

U.S. PATENT DOCUMENTS

| | | | |
|---|---|---|---|
| 4,536,409 A | 8/1985 | Farrell et al. | |
| 5,021,515 A | 6/1991 | Cochran et al. | |
| 5,049,624 A | 9/1991 | Adams et al. | |
| 5,075,362 A | 12/1991 | Hofeldt et al. | |
| 5,211,875 A | 5/1993 | Speer et al. | |
| 5,350,622 A * | 9/1994 | Speer | A23L 3/3436 428/215 |
| 5,639,815 A | 6/1997 | Cochran et al. | |
| 5,955,527 A | 9/1999 | Cochran et al. | |
| 6,083,585 A * | 7/2000 | Cahill | B32B 27/36 428/35.7 |
| 6,500,895 B1 | 12/2002 | Bastiaens et al. | |
| 6,610,234 B2 * | 8/2003 | Akkapeddi | B32B 27/36 428/68 |
| 9,475,630 B2 * | 10/2016 | Deshpande | C07D 209/46 |
| 2010/0316824 A1 * | 12/2010 | Knudsen | C08L 9/00 428/36.92 |
| 2012/0208110 A1 * | 8/2012 | Burns | G03H 1/0248 430/2 |
| 2013/0231422 A1 * | 9/2013 | Deshpande | C08K 5/1545 524/110 |
| 2014/0027339 A1 * | 1/2014 | Deshpande | B01J 20/22 252/400.1 |
| 2014/0145109 A1 * | 5/2014 | Knudsen | B65D 81/266 252/188.28 |
| 2016/0311949 A1 * | 10/2016 | Haberkorn | B65D 65/38 |

FOREIGN PATENT DOCUMENTS

JP H03281246 A 12/1991

OTHER PUBLICATIONS

Total; Poly bd® R20 LMA Technical Data Sheet, 2020, p. 1.*
U.S. Appl. No. 62/328,788, filed Apr. 28, 2016, Shenshen Li.

* cited by examiner

*Primary Examiner* — Robert D Harlan
(74) *Attorney, Agent, or Firm* — Ballard Spahr LLP

(57) ABSTRACT

The disclosure relates to oxygen scavenging polymers, compositions comprising the polymers, articles comprising the polymers and/or compositions, and methods of making the polymers, compositions, and/or articles. This abstract is intended as a scanning tool for purposes of searching in the particular art and is not intended to be limiting of the present invention.

20 Claims, No Drawings

OXYGEN SCAVENGING COMPOSITIONS, ARTICLES CONTAINING SAME, AND METHODS OF THEIR USE

CROSS REFERENCE TO RELATED APPLICATIONS

This application claims benefit of U.S. Provisional Application No. 62/328,788, filed on Apr. 28, 2016, which is hereby incorporated by reference in its entirety.

BACKGROUND

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Use of certain polyamides in combination with a transition metal is known to be useful as the oxygen scavenging material. One particularly useful polyamide is MXD6 which contains meta-xylene residues in the polymer chain. See, for example, U.S. Pat. Nos. 5,639,815; 5,049,624; and 5,021,515.

Other oxygen scavengers include potassium sulfite (U.S. Pat. No. 4,536,409), unsaturated hydrocarbons (U.S. Pat. No. 5,211,875), and ascorbic acid derivatives (U.S. Pat. No. 5,075,362).

One of the known problems experienced with prior art oxygen scavengers is that once they are incorporated into plastic containers, they require a prolonged induction period before the onset of oxygen scavenging. For example, molded containers that employ diamides such as, for example, dibenzyl adipamide (DBA) as oxygen scavengers, the induction period can be at least three months at ambient temperature and humidity or at least four weeks at elevated temperature (38° C.) and humidity (85% RH) after the bottles are filled with deoxygenated water. This induction period is not acceptable in real commercial practice where plastic containers are made and filled immediately (or shortly thereafter) with an oxygen-sensitive food or beverage product. The oxygen scavenging must occur immediately after filling to protect the taste and nutrient qualities of the food and/or beverage products contained within.

Thus, there is still a need in the art for improved materials which provide high oxygen scavenging capability and which have very little or even no measurable induction period for oxygen scavenging. Still further, there is a need in the art for improved materials which provide such oxygen scavenging properties with little or no measurable induction period and which do not require the presence of a compatibilizer component.

SUMMARY

In accordance with the purpose(s) of the invention, as embodied and broadly described herein, the invention, in one aspect, relates to oxygen scavenging polymers, compositions comprising the polymers, methods of making the polymers, and articles comprising the polymers and/or compositions.

Disclosed is a composition comprising: a) a base polymer; b) at least one compound of formula I or II:

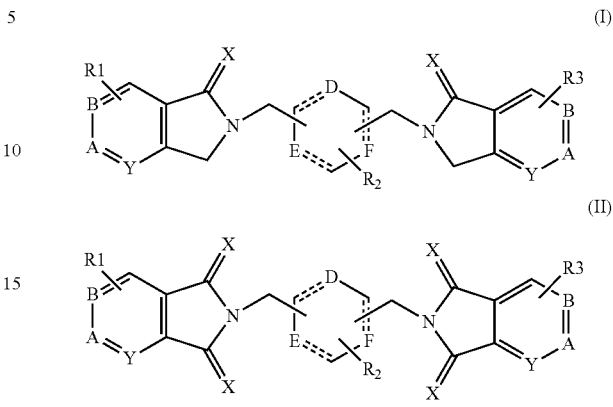

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; c) at least one polydiene compound; and d) at least one transition metal in a positive oxidation state, wherein the composition is substantially free of a compatibilizer.

Also disclosed is a wall of package comprising at least one layer, wherein the layer comprises a composition comprising: a) a base polymer; b) at least one compound of formula I or II:

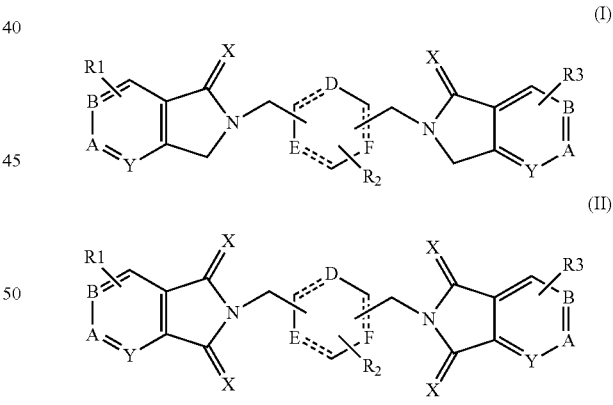

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; c) at least one polydiene compound; and d) at least one transition metal in a positive oxidation state, wherein the composition is substantially free of a compatibilizer.

Also disclosed is a method for packaging an oxygen sensitive material comprising: (a) preparing a package having a wall comprising at least one layer, the at least one layer comprising a composition, wherein the composition comprises: i) a base polymer; ii) at least one compound of formula I or II:

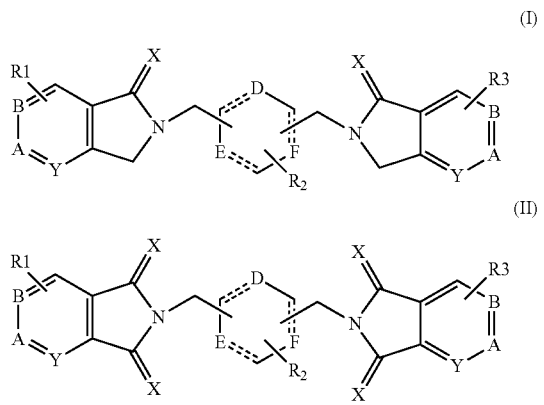

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; iii) at least one polydiene compound; and iv) at least one transition metal in a positive oxidation state, wherein the composition is substantially free of a compatibilizer.

Further disclosed herein is a process for making an article comprising: (a) forming a melt by combining in a melt processing zone: a base polymer; at least one compound of formula I or II:

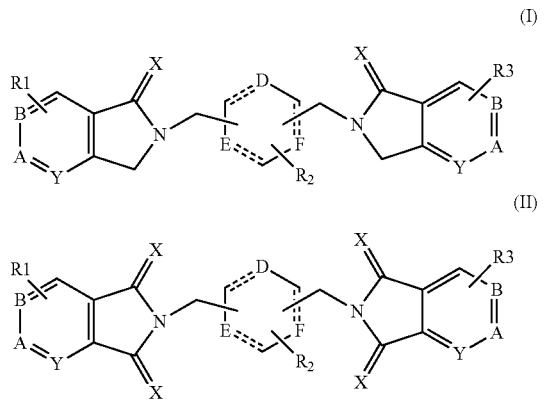

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; at least one polydiene compound; and at least one transition metal in a positive oxidation state, and wherein the composition is substantially free of a compatibilizer; and (b) forming an article from said melt.

Also disclosed herein are compositions, articles and methods wherein the compound is

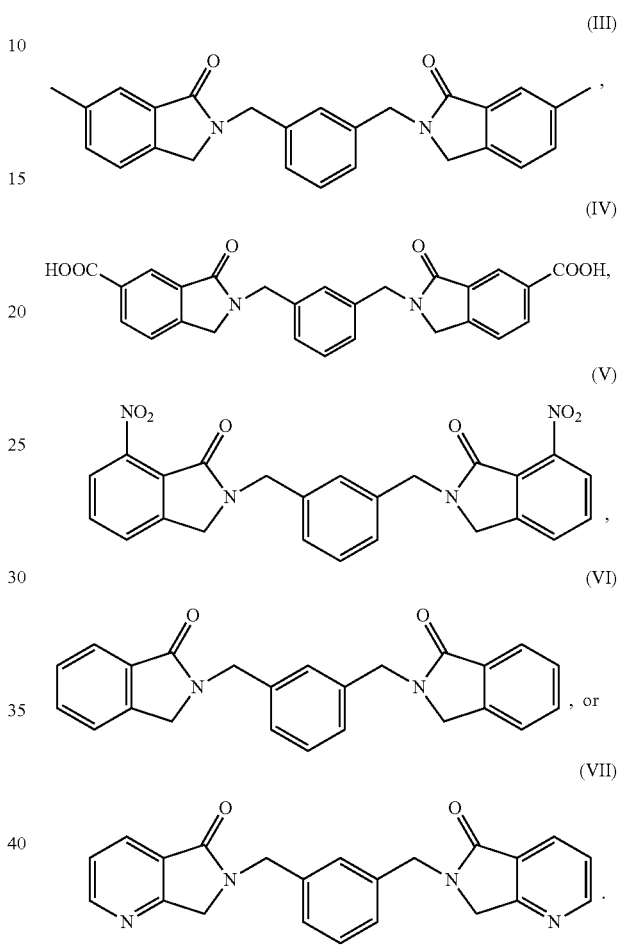

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

All percentages, ratios and proportions herein are by weight, unless otherwise specified. All temperatures are in degrees Celsius (° C.) unless otherwise specified.

Throughout the description and claims of this specification the word "comprise" and other forms of the word, such as "comprising" and "comprises," means including but not limited to, and is not intended to exclude, for example, other additives, components, integers, or steps.

As used herein, the terms "optional" or "optionally" means that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As a further example, when the specification discloses that a composition is "substantially free" of an agent, a person skilled in the relevant art would readily understand that the composition need not be completely free of the agent (i.e., the agent need not be completely absent from the composition). Rather, this term conveys to a person skilled in the relevant art that the agent need only be present in a technically insignificant amount or concentration. In certain aspects, a composition is "substantially free" of an agent when present in less than an amount or concentration less than that necessary to alter the basic and novel properties of the composition. To that end, for example, when an aspect is described as "substantially free" of a substance, the aspect can have no more than 0.01%, 0.05%, 0.1%, 0.2%, 0.5%, 1%, 2%, 3%, 4%, 5%, 6%, 10%, 20%, 40%, 50%, or 60% of the substance, relative to the total mass of the aspect, or in the alternative, relative to the mass of a component (e.g., a composition) thereof.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or from two to four. In one aspect, a collection of oligomers can have an average number of repeating units of from about two to about ten, for example, from about two to about eight, from about two to about six, or from about two to about four.

As used herein, the term "molecular weight" (MW) refers to the mass of one molecule of that substance, relative to the unified atomic mass unit u (equal to $\frac{1}{12}$ the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w on average. The weight average molecular weight can be determined by light scattering, small angle neutron scattering (SANS), X-ray scattering, and sedimentation velocity.

As used herein, the term "induction period" refers to the time required for the oxygen scavenger to begin scavenging oxygen. It is understood that in some aspects, it is desirable for an oxygen scavenger to have a short induction period so as to begin scavenging oxygen immediately after, for example and without limitation the packaging article is filled with food or beverage.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure:

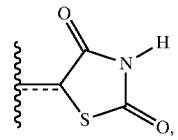

regardless of whether thiazolidinedione is used to prepare the compound. In some aspects, the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

In some aspects, a structure of a compound can be represented by a formula:

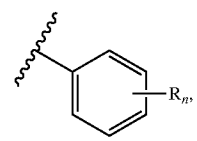

which is understood to be equivalent to a formula:

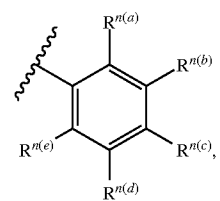

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of from 1 to 24 carbon atoms, for example from 1 to 12 carbons, from 1 to 8 carbons, from 1 to 6 carbons, or from 1 to 4 carbons, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including optionally substituted alkyl, cycloalkyl, alkoxy, amino, ether, halide, hydroxy, nitro, silyl, sulfo-oxo, or thiol as described herein.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bond. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula $NA^1A^2A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein.

The term "carboxylic acid" as used herein is represented by the formula —C(O)OH.

The term "ester" as used herein is represented by the formula —OC(O)$A^1$ or —C(O)O$A^1$, where $A^1$ can be an optionally substituted alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle" as used herein refers to single and multi-cyclic aromatic or non-aromatic ring systems in which at least one of the ring members is other than carbon. Heterocycle includes pyridine, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "hydroxyl" as used herein is represented by the formula —OH.

The term "ketone" as used herein is represented by the formula $A^1C(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by the formula —$N_3$.

The term "nitro" as used herein is represented by the formula —$NO_2$.

The term "nitrile" as used herein is represented by the formula —CN.

The term "thiol" as used herein is represented by the formula —SH.

The terms "electron-withdrawing" or "electron-donating" as used herein refer to the ability of a substituent to withdraw or donate electrons relative to that of hydrogen, if hydrogen occupied the same position in the molecule. These terms are well-understood by one skilled in the art and are discussed, for example, in Advanced Organic Chemistry by J. March, 1985, pp. 16-18. Electron withdrawing groups can include fluoro, chloro, bromo, nitro, acyl, cyano, carboxyl, lower alkenyl, lower alkynyl, carboxaldehyde, carboxyamido, aryl, quaternary ammonium, trifluoro-methyl, alkoxycarbonyl, aryloxycarbonyl, aminocarbonyl, sulfonic, alkanesulfonyl, arylsulfonyl, perfluoroalkanesulfonyl, perfluoroarylsulfonyl, phosphoryl, tertiary amine cation and a combination thereof, among others. Electron donating groups can include such groups as hydroxy, lower alkoxy, lower alkyl, amino, lower alkylamino, di(lower alkyl)amino, aryloxy, mercapto, lower alkylthio, lower alkylmercapto and disulfide among others. One skilled in the art will appreciate that the aforesaid substituents may have electron donating or electron withdrawing properties under different chemical conditions. In some aspects, electron donating or electon withdrawing substitutents are halo, nitro, alkanoyl, carboxaldehyde, arylalkanoyl, aryloxy, carboxyl, carboxamide, cyano, sulfonyl, sulfoxide, heterocyclyl, guanidine, quaternary ammonium, lower alkenyl, lower alkynyl, sulfonium salts, hydroxy, lower alkoxy, lower alkyl, amino, lower alkylamino, di(lower alkylamino), amine lower mercapto, mercaptoalkyl, alkylthio and alkyldithio.

Certain instances of the above defined terms may occur more than once in the structural formulae, and upon such occurrence each term shall be defined independently of the other.

As used herein, the term "effective amount" refers to an amount that is sufficient to achieve the desired result or to have an effect on an undesired condition.

As used herein, the term "leaving group" refers to an atom (or a group of atoms) with electron withdrawing ability that can be displaced as a stable species, taking with it the bonding electrons. Examples of suitable leaving groups include sulfonate esters, including triflate, mesylate, tosylate, brosylate, and halides.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

B. Compositions

In one aspect, disclosed herein is a composition comprising) a base polymer; b) at least one compound of formula I or II:

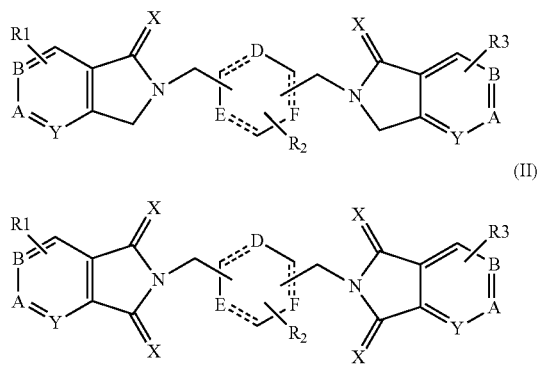

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; and c) at least one polydiene compound; and d) at least one transition metal in a positive oxidation state, wherein the composition is substantially free of a compatibilizer.

In yet other aspects, the composition disclosed herein is an oxygen scavenging composition.

The amounts of the components used in the oxygen scavenging formulations described herein can affect the use and effectiveness of this composition. Thus, the amounts of the base polymer, the at least one compound of formula (I) or (II), the at least one polydiene, the at least one transition metal catalyst, antioxidant, polymeric diluents, additives, etc., can vary depending on the desired article and its end use. For example, one of the primary functions of the at least one compound of formula (I) or (II), and the at least one polydiene described herein is to react irreversibly with oxygen during the scavenging process, while a primary function of the transition metal catalyst is to facilitate this process. Thus, to a large extent, the amount of the at least one compound of formula (I) or (II) and the at least one polydiene present affects the oxygen scavenging capacity of the i.e., the amount of oxygen that the composition can consume, while the amount of transition metal catalyst and the at least one polydiene present affects the rate at which oxygen is consumed as well as the induction period.

1. Compounds of Formula I and II

In one aspect, disclosed herein are compounds of Formula I and II:

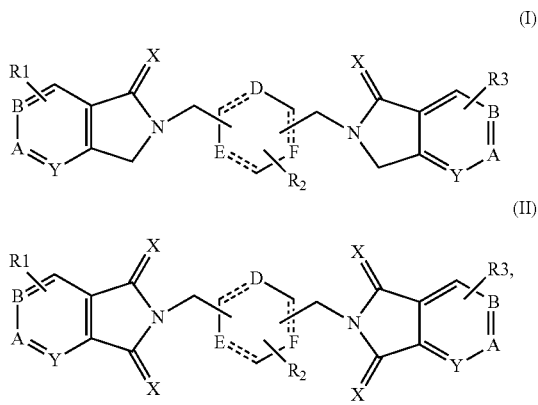

wherein X is selected from the group consisting of O, S and NH; Y, A and B are independently selected from the group consisting of N and CH; D, E and F are independently selected from the group consisting of CH, N, O and S; the symbol ---represents a single or a double bond; and $R_1$, $R_2$, and $R_3$ are independently selected from the group consisting of H, electron withdrawing groups and electron releasing groups.

In some aspects, this disclosure is directed to the compounds having the formula

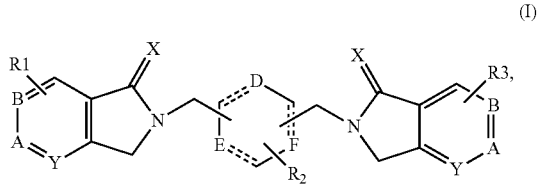

wherein X is O, S or NH; Y, A and B are independently N or CH; D, E and F are independently CH, N, O or S; the symbol --- in addition to the solid line represents a single or a double bond; and $R_1$, $R_2$, and $R_3$ are independently H, electron withdrawing groups or electron releasing groups.

In certain aspects, X is O; Y, A, and B are all CH; D, E, and F are all CH; -- is a double bond; and $R_1$, $R_2$, and $R_3$ are all hydrogen. In some aspects, the compounds have the formula:

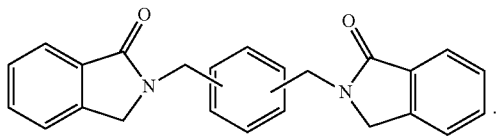

In other aspects, the compounds have the formula:

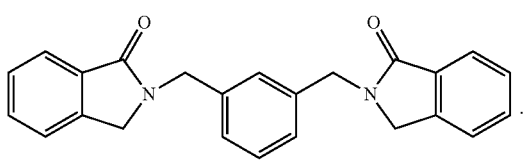
(VI)

In other aspects, X is O; Y is N; A, and B are CH; D, E, and F are all CH; ---- is a double bond; and $R_1$, $R_2$, and R3 are all hydrogen. In yet other aspects, the compounds of the present invention have the formula:

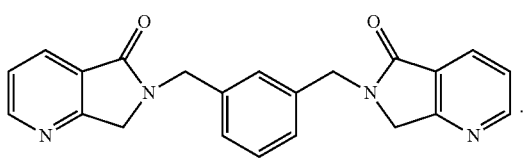
(VII)

In yet other aspects $R_1$ and $R_3$ are electron releasing groups. Electron releasing groups, also known as electron donating groups, are known in the art. In some aspects, electron releasing groups comprise branched and straight chain alkyl groups, for example, methyl, ethyl, propyl, isopropyl, butyl, isobutyl, and tert-butyl.

In certain aspects, the compounds described herein have the formula

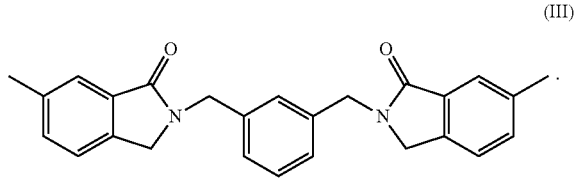
(III)

Yet in other aspects, the electron releasing groups comprise alkoxy, for example methoxy and ethoxy. Still other preferred electron releasing groups include amines, for example —$NH_2$ and N(loweralkyl)$_2$.

In still other aspects, $R_1$ and $R_3$ are electron withdrawing groups. Electron withdrawing groups are known in the art. In certain aspects electron withdrawing groups comprise nitro, carboxylic acid, esters, for example loweralkyl esters, and cyano. In some aspects, the compounds of the present invention have the formula:

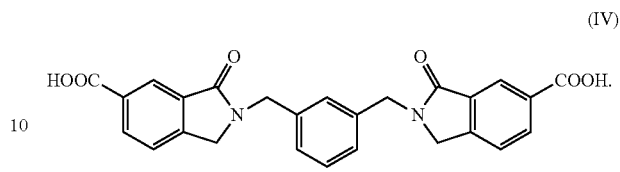
(IV)

In yet other aspects, the compounds described herein have the formula:

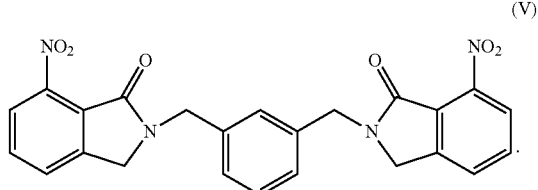
(V)

Yet in other aspects, the compounds described herein are of the formula:

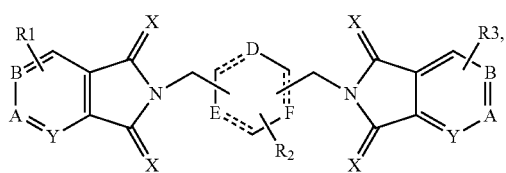
(II)

wherein X is O, S or NH; Y, A, and B are independently N or CH; D, E, and F are independently CH, N, O, or S; the symbol --- in addition to the solid line represents a single or a double bond; and $R_1$, $R_2$, and $R_3$ are independently H, electron withdrawing groups or electron releasing groups. In certain aspects, X is O; Y, A, and B are all CH; D, E, and F are all CH; ---- is a double bond; and $R_1$, $R_2$ and $R_3$ are all hydrogen.

In further aspects, the compounds described herein have the formula:

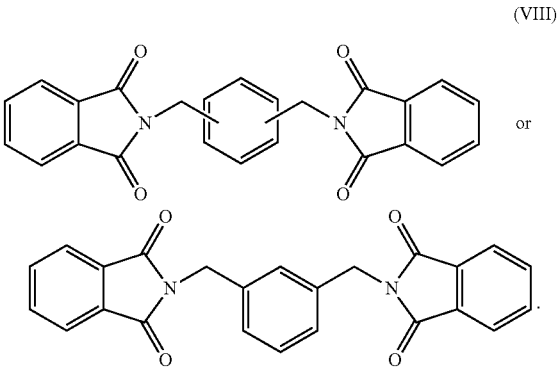
(VIII)

or

In some aspects, the at least one compound of formula (I) or (II) is present in an amount of about 0.1% to about 10% by weight of the composition, including exemplary values of about 0.5%, about 1%, about 2%, about 3%, about 4%, about 5%, about 6%, about 7%, about 8%, and about 9%. In yet other aspects, the at least one compound of formula (I) or (II) can be present in any amount between in any two foregoing values. In some aspects, the at least one compound of formula (I) or (II) can be present from about 1% to about 5%, or from about 3% to about 8% by weight of the composition.

In some aspects, the disclosure is directed to synthesis of the compounds described herein. In a first synthetic scheme about 2 moles of a compound of the formula

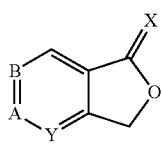

is reacted under reaction conditions to release water, which is trapped in a Dean-Stark trap, with one mole of a compound of the formula

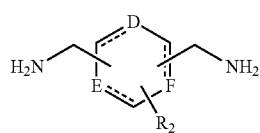

to produce the desired product having the formula:

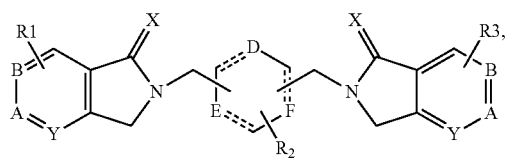

wherein all the groups are as defined above.

In one aspect, 2 moles of phthalide (also known as o-hydroxymethyl-benzoic acid lactone or 1,3-dihydrobenzo[c]furan-1-one or oxophthalane or 1(3H)-isobenzo-furanone) are reacted with meta-xylylenediamine as shown below:

Scheme 1

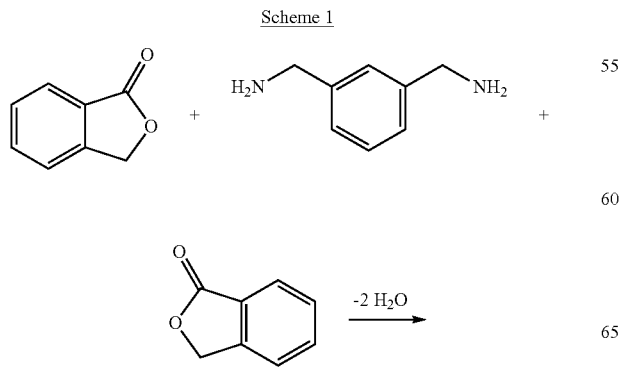

-continued

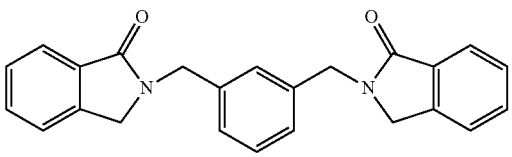

In yet other aspect, phthalic anhydride is reacted with metaxylylene diamine to produce the diimide product and then as shown below:

Scheme 2

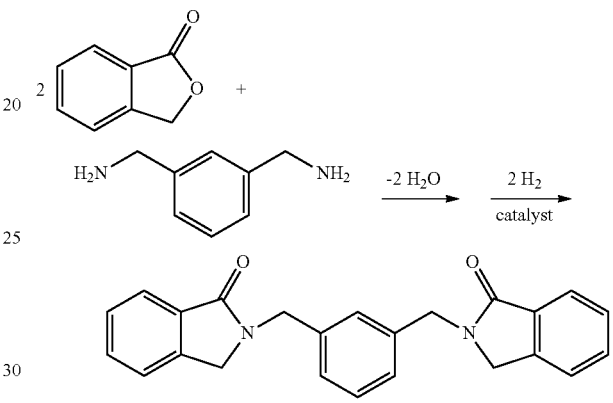

In yet other aspects, the compounds described herein can be prepared using methods known generally in the art in accordance with the following Schemes:

Scheme 3

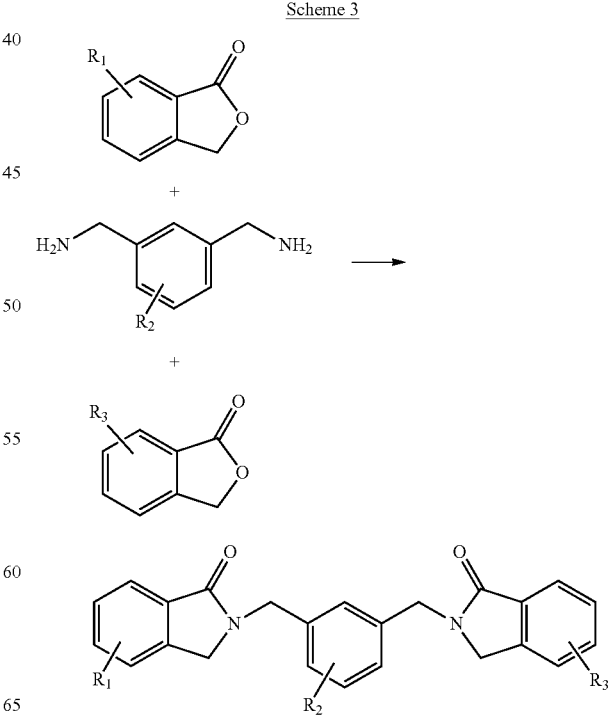

Scheme 4
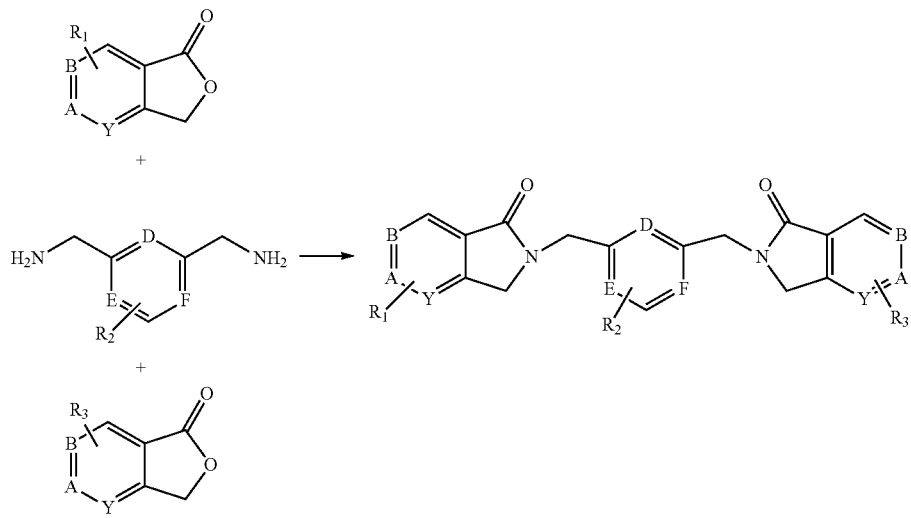
In even further aspects, the compounds can be prepared according to the Schemes below:
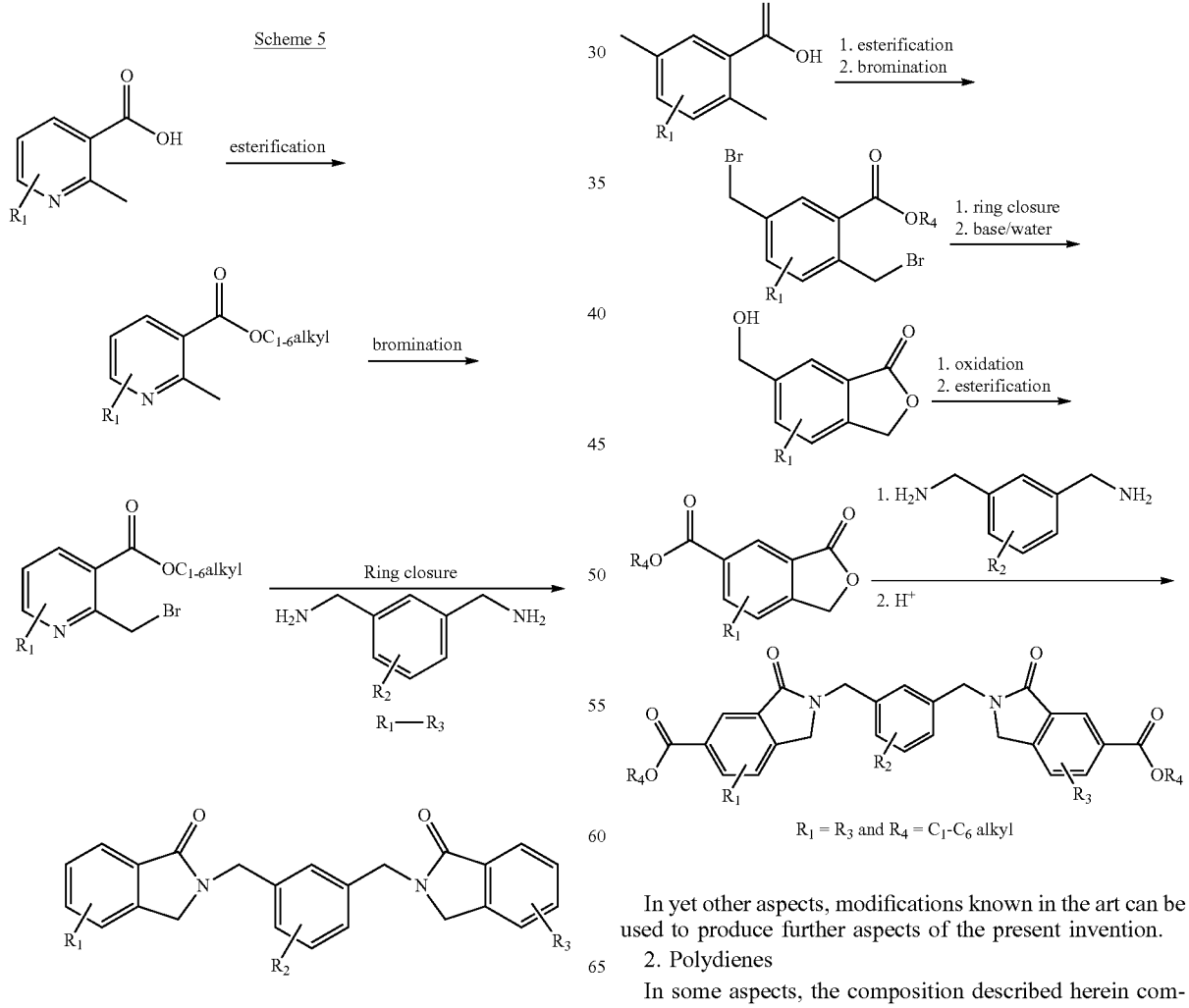
In yet other aspects, modifications known in the art can be used to produce further aspects of the present invention.
2. Polydienes
In some aspects, the composition described herein comprises at least one polydiene. In yet other aspects, the at least one polydiene is present in an amount of about 0.01% to about 10% by weight relative to the at least one compound of formula (I) or (II), including exemplary values of about 0.1%, 0.5%, about 1%, about 2%, about 3%, about 4%, about 5%, about 6%, about 7%, about 8%, and about 9%. In yet other aspects, the at least one polydiene can be present in any amount between in any two foregoing values. For example, in some aspects the at least one polydiene can be present from about 0.1% to about 1.0%. In other aspects, the at least one polydiene can be present from about 1% to about 5%, or from about 3% to about 8% by weight relative to the at least one compound of formula (I) or (II).

In certain aspects, the at least one polydiene is present in the form of particles whose average particle size is in the range of from about 5 nm to about 1000 nm, including exemplary values of about 10, about 50 nm, about 100 nm, about 150 m, about 200 nm, about 300 nm, about 400 nm, about 500 nm, about 600 nm, about 700 nm, about 800 nm, and about 900 nm. In some aspects, the average particle size can be in any range between any two foregoing values. For example, the average particle size can be about 10 nm to about 400 nm, about 10 nm to about 300 nm, or about 10 nm to about 200 nm, or from about 5 nm to about 150 nm.

In certain aspects, the at least one polydiene present in the composition has the number average molecular weight (Mn) from about 500 to about 10,000, including exemplary values of about 600, about 700, about 800, about 900, about 1,000, about 2,000, about 3,000, about 4,000, about 5,000, about 6,000, about 7,000, about 8,000, and about 9,000. In yet other aspects, the number average molecular weight (Mn) of the at least one polydiene can be in any range between any two foregoing values. For example, the number average molecular weight (Mn) of the at least one polydiene can be from about 700 to about 3,000 or from about 1,000 to about 2,000.

In some aspects, the at least one polydiene present in the mixture is at least one oxidizable polydiene. In yet other aspects, the at least one oxidizable polydiene can comprise at least one functionalized oxidizable polydiene, or at least one un-functionalized polydiene, or a combination thereof. In some aspects, the at least one oxidizable polydiene can comprise at least one functionality capable of reacting with the at least one compound of formula (I) or (II). In yet other aspects, the functionality present on the at least one oxidizable polydiene is capable of reacting with the functional groups present on the compound of formula (I) or (II).

In some aspects, the at least one functionalized oxidizable polydiene can comprise an epoxy or anhydride functionality capable of reacting with end groups on compound of formula (I) or (II). In yet other aspects, the functionality in the polydiene can react with amide group in the backbone of the compound of formula (I) or (II). In some aspects, the functionality can be along a main backbone or at the chain ends of the functionalized polydiene.

In certain aspects, polydienes present in the disclosed composition comprise functional polyalkadiene oligomers which can have the following general backbone structure:

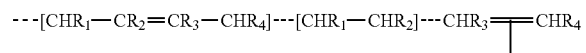

where $R_1$, $R_2$, $R_3$ and $R_4$ can be the same or different and can be selected from hydrogen (—H) or any of the lower alkyl groups (methyl, ethyl, propyl, butyl etc.). $R_2$ & $R_3$ may also be a chloro (—Cl) group. In some aspects, the exemplary backbone structures comprise polybutadiene (1,4 or 1,2 or mixtures of both), polyisoprene (1,4 or 3,4), poly 2,3-dimethyl butadiene, polychloroprene, poly 2,3-dichlorobutadiene, polyallene, poly 1,6-hexatriene, and the like. In yet other aspects, for example and without limitation, oxidizable polydienes can comprise epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene, or any combination thereof.

In some aspects, the composition comprises a blend of the at least one polydiene and the at least one compound of formula (I) or (II). In some aspects, the blend is a homogeneous blend of the at least one polydiene and the at least one compound of formula (I) or (II). In yet other aspects, as described herein the polydiene can be present as particles. In these aspects, the polydiene particles can substantially uniformly distributed in the at least on compound of formula (I) or (II). In certain aspects, the composition disclosed herein can further comprise a reaction product of the at least on functionalized oxidizable polydiene described herein and the at least one compound of formula (I) or (II).

In certain aspects, the at least one polydiene present in the composition is an oxygen scavenger. In yet other aspects, the at least one polydiene present in the composition is a primary oxygen scavenger. In yet other aspects, the at least one polydiene can be activated showing substantially no induction period. In yet other aspects, the at least one polydiene can exhibit an induction period shorter that the at least one compound of formula (I) or (II). In still other aspects, the at least one polydiene present in the composition can be activated first to act as an oxygen scavenger, and then the at least one compound of formula (I) or (II) is activated to act as an oxygen scavenger. In these aspects, it is contemplated that the oxygen scavenging capabilities of the inventive composition are continuous with the at least one polydiene starting to scavenge oxygen first and at the least one compound of formula (I) or (II) starting to scavenge the oxygen by the end of its induction period. It is also contemplated that the interactions among ingredients synergistically accelerate the initiation process native to the at least one compound of formula (I) or (II) when compared to that of these compounds in absence of the at least one polydiene. In yet other aspects, the compositions disclosed herein can exhibit oxygen scavenging capabilities within a time period ranging from about 0 days to about 3 years, including exemplary values of greater than 0 days, about 1 day, about 7 days, about 14 days, about 1 month, about 6 months, about 1 year, about 1.5 years, about 2 years, and about 2.5 years. In yet other aspects, the composition disclosed herein exhibits oxygen scavenging capabilities in a time period that can be in any range derived from the foregoing values. For example, the compositions disclosed herein can exhibit oxygen scavenging capabilities in a time period that can be from about 6 months to about 1 year, or from about 6 months to about 2.5 years.

3. Base Polymer

In some aspects, the composition comprises a base polymer. In yet other aspects, the at least compound of formula (I) or (II), and the at least one polydiene can be added to the base polymers.

In some aspects, examples of the base polymers in which the additives are useful include polymers, both homopolymers and copolymers, of olefinically unsaturated monomers, for example, polyolefins such as polyethylene, polypropylene, polybutadiene, and the like. Also, poly-halohydrocarbons such as polyvinyl chloride, polychloroprene, polyvinylidene chloride, polyfluoro olefins, and the like, are afforded stabilization. In certain aspects, the oxygen scavenging additives described herein can provide antioxidant protection in natural and synthetic rubbers such as copolymers of olefinically unsaturated monomers including styrene-butadiene rubber (SBR rubber), ethylenepropylene ethylene-propylenediene terpolymers such as the terpolymer of ethylene, propylene and cyclopentadiene or 1,4-cyclooctadiene. Polybutadiene rubbers such as cis-polybutadiene rubber are protected. Poly-2-chloro-1,3-butadiene (neoprene) and poly-2-methyl-1,3-butadiene (isoprene rubber) are stabilized by the present additives. Likewise, acrylonitrile-butadiene-styrene (ABS) resins are effectively stabilized. Ethylenevinyl acetate copolymers are protected, as are butene-methylacrylate copolymers. Nitrogen-containing polymers such as polyurethanes, nitrile rubber, and lauryl acrylate-vinyl-pyrrolidone copolymers are effectively stabilized. Adhesive compositions such as solutions of polychloroprene (neoprene) in toluene are protected.

In some aspects, petroleum oils such as solvent-refined, midcontinent lubricating oil and Gulfcoast lubricating oils are effectively stabilized. In yet other aspects, in hydrocarbon lubricating oils, both mineral and synthetic, the present additives are particularly effective when used in combination with a zinc dihydrocarbyldithiophosphate, e.g. zinc dialkyldithiophosphate or zinc dialkaryldithiophosphate.

In certain aspects, synthetic ester lubricants such as those used in turbines and turbojet engines are given a high degree of stabilization. In yet other aspects, typical synthetic ester lubricants can include di-2-ethylhexyl sebacate, trimethylolpropane tripelargonate, $C_{5-9}$ aliphatic monocarboxylic esters of pentaerythritol, complex esters formed by condensing under esterifying conditions, mixtures of polyols, polycarboxylic acids, and aliphatic monocarboxylic acids and/or monohydric alkanols. In certain aspects, an example of these complex esters can include the condensation product formed from adipic acid, ethyleneglycol and a mixture of $C_{5-9}$ aliphatic monocarboxylic acids. In still other aspects, plasticizers such as dioctyl phthalate are effectively protected. In still further aspects, heavy petroleum fractions such as tar and asphalt can also be protected should the need arise.

In certain aspects, polyamides such as adipic acid-1,6-diaminohexane condensates and poly-6-aminohexanoic acid (nylon) are effectively stabilized. In yet other aspects, polyalkylene oxides such as copolymers of phenol with ethylene oxide or propylene oxide are stabilized. In yet other aspects, polyphenyl ethers such as poly-2,6-dimethylphenyl ether formed by polymerization of 2,6-dimethylphenol using a copper-pyridine catalyst are stabilized. In still further aspects, polycarbonate plastics and other polyformaldehydes are also protected.

In some aspects, linear polyesters such as phthalic anhydride-glycol condensates are given a high degree of protection. In yet other aspects, polyesters such as those derived from terephthalic acid and alkylene glycols are also given a high degree of protection. In still further aspects, other polyesters such as trimellitic acid-glycerol condensates are also protected. In certain aspects, polyacrylates such as polymethylacrylate and polymethylmethacrylate are effectively stabilized. In yet further aspects, polyacrylonitriles and copolymers of acrylonitriles with other olefinically unsaturated monomers such as methylmethacrylates are also effectively stabilized.

In some aspects, the base polymer in the composition is a polyester. In certain aspects, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles. In still further aspects, the polyester is polyethylene terephthalate (PET). In some aspects, the PET, for example, can be prepared from terephthalic acid and ethylene glycol. In yet other aspects, the PET can also be prepared, for example, from dimethyl terephthalate and ethylene glycol.

Various methods are known in the art for the preparation of PET including, but not limited to, esterification and polycondensation. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

Blends of different base polymers also can be used. Suitable base polymers include polyethylene, such as low density polyethylene, very low density polyethylene, ultra-low density polyethylene, high density polyethylene, and linear low density polyethylene; polyesters such as PET, polyethylene naphthalate (PEN) and their copolymers such as polyethylene terephthalate isophthalate (PET/IP); polyvinyl chloride (PVC); polyvinylidene chloride (PVDC); and ethylene copolymers such as ethylene/vinyl acetate copolymer, ethylene/alkyl (meth)acrylate copolymers, ethylene/(meth)acrylic acid copolymers, and ionomers.

In some aspects, exemplary polyester polymers can include polyethylene terephthalate homopolymers and copolymers modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less (collectively referred to for brevity as 'PET") and polyethylene naphthalate homopolymers and copolymers modified with a cumulative amount of with less than about 15 mole %, or about 10 mole % or less, or about 8 mole % or less, of one or more polycarboxylic acid modifiers or modified less than about 60 mol %, or less than about 50 mole %, or less than about 40 mole %, or less than about 15 mole %, or about 10 mole % or less, or about 8 mole mole % or less of one or more hydroxyl compound modifiers (collectively referred to herein as "PEN"), and blends of PET and PEN. A modifier polycarboxylic acid compound or hydroxyl compound is a compound other than the compound contained in an amount of at least about 85 mole %. The preferred polyester polymer is polyalkylene terephthalate, and most preferred is PET.

In some aspects, the polyester polymer can contain at least about 90 mole % ethylene terephthalate repeat units, and in other aspects, at least about 92 mole %, and in yet other aspects, or at least about 94 mole %, based on the moles of all repeat units in the polyester polymers.

In some aspects, in addition to a diacid component of terephthalic acid, derivates of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having about 8 to about 14 carbon atoms, aliphatic dicarboxylic acids preferably having about 4 to about 12 carbon atoms, or cycloaliphatic dicarboxylic acids preferably having about 8 to about 12 carbon atoms. Examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid." It is also possible for trifunctional and higher order polycarboxylic acids to modify the polyester.

In some aspects, the hydroxyl component is made from compounds containing 2 or more hydroxyl groups capable of reacting with a carboxylic acid group. In some other aspects, hydroxyl compounds contain 2 or 3 hydroxyl groups. In yet other aspects, have 2 hydroxyl groups. These hydroxyl compounds include $C_2$-$C_4$ alkane diols, such as ethylene glycol, propane diol, and butane diol, among which ethylene glycol is most preferred for container applications. In addition to these diols, other modifier hydroxyl compound component(s) may include diols such as cycloaliphatic diols preferably having 6 to 20 carbon atoms and/or aliphatic diols preferably having about 3 to about 20 carbon atoms. Examples of such diols include diethylene glycol; triethylene glycol; 1,4-cyclohexanedimethanol; propane-1,3-diol and butane-1,4-diol (which are considered modifier diols if ethylene glycol residues are present in the polymer in an amount of at least 85 mole % based on the moles of all hydroxyl compound residues); pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In some aspects, modifiers include isophthalic acid, naphthalenic dicarboxylic acid, trimellitic anhydride, pyromellitic dianhydride, 1,4-cyclohexane dimethanol, and diethylene glycol.

In certain aspects, the amount of the base polymer in the composition ranges from greater than about 50.0 wt. %, or from about 80.0 wt. %, or from about 90.0 wt. %, or from about 95.0 wt. %, or from about 96.0 wt. %, or from about 97 wt. %, and up to about 99.90 wt. %, based on the combined weight of all components in the composition.

In yet other aspects, the base polymer comprises a majority of the composition of the disclosure, and in some aspects the base polymer is present in an amount of at least about 80 wt. %, or at least about 90 wt. %, based on the weight of the composition (excluding fillers, inorganic compounds or particles, fibers, impact modifiers, or other polymers serve as impact modifiers or which form a discontinuous phase such as may be found in cold storage food trays).

It is further understood that in certain aspects, the oxygen scavenging compounds can be added to protect any of the many organic substrates to which an antioxidant is normally added. It can be used where economics permit to protect such substrates as asphalt, paper, fluorocarbons such as Teflon®, polyvinyl acetate, polyvinylidene chloride, coumarone-indene resins, polyvinyl ethers, polyvinylidene bromide, polyvinyl bromide, acrylonitrile, vinyl bromide copolymer, vinyl butyral resins, silicones such as dimethylsilicone lubricants, phosphate lubricants such as tricresylphosphate, and the like.

4. Transition Metals

In some aspects, the composition can further comprise at least one transition metal in a positive oxidative state. In some aspects, the at least one transition metal can act as an oxygen scavenger catalyst. In certain aspects, the transition metal can be selected from the first, second, or third transition series of the Periodic Table. The metal can be Rh, Ru, or one of the elements in the series of Sc to Zn (i.e., Sc, Ti, V, Cr, Mn, Fe, Co, Ni, Cu, and Zn).

In certain aspects, the transition metal described herein is a transition metal in the positive oxidation state. It should be noted that it is contemplated that one or more such metals may be used. In some aspects, cobalt is added in +2 or +3 oxidation state. In some aspects, the transition metal comprises cobalt in the +2 oxidation state. In certain aspects, the transition metal comprises copper in the +2 oxidation state. In yet other aspects, the transition metal comprises rhodium in the +2 oxidation state. In still further aspects, zinc can also be added to the composition. It is understood that in the aspects where zinc compounds are used, zinc can be present in a positive oxidation state.

In certain aspects, transition metals comprising cobalt, zinc, or a combination thereof can be used to activate or promote oxygen scavenging. The mechanism by which these transition metals function to activate or promote the oxygen scavenging is not certain. The transition metal may or may not be consumed in the oxidation reaction, or, if may only be consumed temporarily by converting back to a catalytically active state. It should be noted that a measure of the catalyst may be viewed as an initiator "generating free radicals which through branching chain reactions leads to the scavenging of oxygen out of proportion to the quantity of "catalyst"" (see U.S. Pat. No. 5,955,527).

A variety of anions can stabilize the positively charged transition metal. Suitable anions for the salts include, but are not limited to, chloride, acetate, oleate, stearate, palmitate, 2-ethylhexanoate, carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, dioxides, hydroxides, nitrates, phosphates, sulfates, or silicates, among others. Representative transition metal salts include, but are not limited to, cobalt (II) 2-ethylhexanoate, cobalt oleate, cobalt (II) stearate and cobalt (II) neodecanoate. The transition metal salt may also be an ionomer, in which case a polymeric counter ion can be present. In yet other aspects, the catalyst is cobalt (ii) carboxylate.

In certain aspects, and as disclosed above the transition metal can enhance the oxygen scavenging properties of the oxygen scavenger compound. Thus, in various the transition metal is present in an amount of from about 10 ppm to about 500 ppm. In a further aspect, the transition metal is present in an amount of from about 10 ppm to about 450 ppm. In a further aspect, the transition metal is present in an amount of from about 10 ppm to about 400 ppm. In a further aspect, the transition metal is present in an amount of from about 10 ppm to about 350 ppm. In a still further aspect, the transition metal is present in an amount of from about 10 ppm to about 300 ppm. In yet a further aspect, the transition metal is present in an amount of from about 10 ppm to about 250 ppm. In an even further aspect, the transition metal is present in an amount of from about 10 ppm to about 200 ppm. In a still further aspect, the transition metal is present in an amount of from about 10 ppm to about 150 ppm. In yet a further aspect, the transition metal is present in an amount of from about 10 ppm to about 100 ppm. In an even further aspect, the transition metal is present in an amount of from about 10 ppm to about 50 ppm. In a still further aspect, the transition metal is present in an amount of from about 50 ppm to about 500 ppm. In yet a further aspect, the transition metal is present in an amount of from about 100 ppm to about 500 ppm. In an even further aspect, the transition metal is present in an amount of from about 150 ppm to about 500 ppm. In a still further aspect, the transition metal is present in an amount of from about 200 ppm to about 500 ppm. In yet a further aspect, the transition metal is present in an amount of from about 250 ppm to about 500 ppm. In an even further aspect, the transition metal is present in an amount of from about 300 ppm to about 500 ppm. In a still further aspect, the transition metal is present in an amount of from about 350 ppm to about 500 ppm. In a still further aspect, the transition metal is present in an amount of from about 400 ppm to about 500 ppm. In a still further aspect, the transition metal is present in an amount of from about 450 ppm to about 500 ppm.

5. Compatibilizers

In some aspects of this disclosure the described compositions are substantially free of compatibilizers. Compatibilizers are known in the art. Compatibilizers, also referred as coupling agents, are additives that when added to a blend of immiscible material, they can modify their interfacial properties and stabilize the melt blend. In some aspects, block or graft copolymers are commonly used as compatibilizing agents. In yet other aspects, the immiscible polymer blends can be compatibilized by creating copolymers in the solution or melt state—the process known as a reactive compatibilization. Copolymers are formed when the proper functional groups in each component of the immiscible blend interact in the compatibilization process. These interactions include hydrogen, ionic or covalent bonding. In yet other aspects, the compatibilizers can include polymers that have both polar and non-polar functional groups. In exemplary aspects, such compatibilizers can include a fatty-acid having both polar and non-polar functionalities.

In yet other aspects, the compositions are substantially free of compatibilizers comprising an ionic compatibilizer. In certain aspects, the ionic compatibilizer is derived from a co-monomer that has been reacted into the polymer chain. To be a co-monomer, the ionic compatibilizer is functionalized with at least one end group which allows the ionic compatibilizer to react with at least one of the other polymers or polymer co-monomers in the composition.

In the aspects, wherein the polymers are polyesters, these can be the polar co-monomers used to create polyester ionomers. In the aspects, wherein the polymers are polyamides, the ionic compatibilizer can be the polar co-monomers used to create polyamide ionomers. Examples of these co-monomers are the monovalent and/or divalent salt of the respective sulfonate described in U.S. Pat. No. 6,500,895 (B1) the teachings of which are incorporated herein. Also included are the monovalent and bivalent metal salts described in the following formulas found in Japanese Patent Application 0 3281246 A.

In some aspects, the ionic compatibilizers can be derived from the salt of sulfoisophthalic acid or its dimethyl ester. In yet other aspects, the ionic compatibilizers can comprises a sulfonated comonomer having —$SO_3M$ groups, where M is the metal ion and R is an aliphatic, aromatic, or cyclic compound with at least one functional group that allows the functionalized metal salt to react with the polyester or polyamide, or their respective monomers or oligomers where M designates the metal ion. In some aspects, exemplary functionalized metal sulfonates can comprise the lithium, sodium, and potassium salts of sulfonated comonomers, including aliphatic and aromatic alcohols, carboxylic acids, diols, dicarboxylic acids, and multifunctional alcohols, carboxylic acids, amines and diamines. In yet other aspects, non-functional metal sulfonates are those of the R—$SO_3M$, and R does not have functional group. It is understood that the phrase metal sulfonate therefore can refer to both functional and non-functional metal sulfonates. In exemplary aspects, sulfonated polystyrene or polyolefins can act as ionic compatibilizers in, for example, the polyester-polyamide systems.

In general, the ionic compatibilizer can be in a functionalized form of the X—R, where X is an alcohol, carboxylic acid or epoxy, most preferably a dicarboxylic acid or diol and R is R is —$SO_3M$, —COOM, —OM, —$PO_3(M)_2$, with M being a metal in a +1 or +2 valence state which can be selected from the group consisting of Li, Na, Zn, Sn, K and Ca and X—R is copolymerized into the polyester polymer to modify the interfacial tension. In certain aspects, the amount of X—R exceeds 0.01 mole percent with respect to the total number of respective dicarboxylic acid or diol moles in the polymer composition. In yet other aspects, it is possible for X—R to include both a diol or dicarboxylic acid. In these aspects, the mole percent is based upon the total number of moles of respective diols, dicarboxylic acids, or polymer repeating units.

In certain aspects, the functionalized ionic compatibilizer can contain 2 or more R groups. R is combined directly to the aromatic ring of X, which could be a diol, a dicarboxylic acid, or a side chain such as a methylene group.

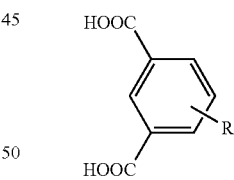

where R is —$SO_3M$, —COOM, —OM, —$PO_3(M)_2$ with M designating a metal in a +1 or +2 valence state which can be selected from the group consisting of Li, Na, Zn, Sn, Ca and K. In certain aspects, the dicarboxylic acids represented by X may be each ortho, meta, or para. They comprise for instance aromatic dicarboxylic acids such as terephthalic acid, isophthalic acid, orthophthalic acid, naphthalene dicarboxylic acid, diphenylether dicarboxylic acid, diphenyl-4,4-dicarboxylic acid etc.

In yet other aspects, X can be aliphatic. In these aspects, aliphatic dicarboxylic acids such as oxalic acid, malonic acid succinic acid, glutaric acid, adipic acid, pimelic acid, suberic acid, azelaic acid, sebacic acid, etc. are suitable. In other aspects, cycloaliphatic dicarboxylic acids such as cyclohexanedicarboxylic acid and one or more species of these can be used. In yet other aspects, also included is isethionic acid. In still further aspects, the mixtures of the dicarboxylic acids can be also used.

X can also represent an alcohol, preferably a diol of the structure:

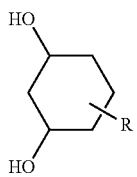

where R is —$SO_3M$, —COOM, —OM, —$PO_3(M)_2$ where M is a metal in a +1 or +2 valence state which can be selected from the group consisting of Li, Na, Zn, Sn, K, and Ca.

In certain aspects, the diols represented by X can also be aliphatic glycols such as ethylene glycol, 1,3 propanediol, 1,4-butanediol, 1,5-pentanediol, 1,6-hexanediol, 1,9-nonanediol, diethylene glycol, trimethylene glycol and cycloaliphatic diols such as cyclohexanediol, cyclohexanedimethanol and one or more species in combination can be used. In yet other aspects, the diols comprise ethylene glycol, diethylene glycol and cyclohexanediol.

In yet other aspects, other functionalized ionic compatibilizers comprise hydroxyl terminated polyethers, such as polyethylene glycol (Carbowax) and cyclic amides such as ethoxylated dimethyl hydantoin.

In some aspects, the functionalized ionic compatibilizer can comprise lithium sulfoisophthalic acid:

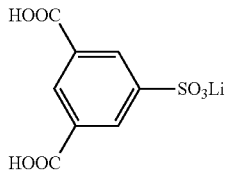

In some aspects, the functionalized ionic compatibilizers comprise di-carboxylic acid, di-ester, or pre-reacted low molecular weight oligomers comprising the bis-hydroxyethyl ester of lithium sulfoisophthalate. It is also possible that the ionic compatibilizer, in this case the lithium sulfonate, occur in the diol form as well.

In certain aspects, the functionalized ionic compatibilizers have at least one functional group comprising carboxylic acid (—COOH), alcohol (—OH), the ester of the carboxylic acid, epoxy termination, the diamine, or amine end groups.

In certain aspects, the compatibilizer can comprise non-functionalized ionic compatibilizers. In some aspects, the non-functionalized ionic compatibilizers are those compounds which contain the polar group, in particular the lithium salt, but do not have any functional end groups which allow the ionic compatibilizer to react with the polyester or polyamide. In exemplary aspects, such compatibilizers comprise a lithium salt of sulfonated polystyrene is an example.

As taught above, the compositions described herein are substantially free of the foregoing ionic compatibilizer.

6. Other Additives

In a further aspect, the composition can further comprise a colorant in a visually effective amount. A visually effective amount refers to an amount of colorant that results in the composition or an article made therefrom appear colored to the naked eye. A visually effective amount can be determined, for example, by performing a spectrophotometric scan of the composition or article using a wavelength range from 400 to 700 nm (visible region). Specific colors can be characterized according to their spectral pattern. Every color also has its own characteristic L (lightness gradation), a (red to green) and b (yellow to blue) numbers, which can be used to characterize the compositions and articles.

The colorant can be a variety of pigments and dyes, many of which are commercially available. Suitable colorants include, but are not limited to, COLORMATRIX Dark Amber, product code: 189-10034-6, COLORMATRIX Dead Leaf Green, product codes: 284-2801-3 and 84-2801-1, AMERICHEM amber, product code: 59108-CD1, Champaigne green, and COLORMATRIX amber, product code: 189-10100-1.

In a further aspect, the colorant is present in an amount of at least 0.01 wt %. In a still further aspect, the colorant is present in an amount of at least 0.1 wt %. In yet a further aspect, the colorant is present in an amount of at least 0.25 wt %. In an even further aspect, the colorant is present in an amount of at least 0.5 wt %.

In a further aspect, the composition further comprises a reheat additive. Reheat additives are commonly used in the manufacture of polyester polymer compositions used to make stretch blow molded bottles because the preforms made from the composition must be reheated prior to entering the mold for stretch blowing into a bottle. Suitable reheat additives include, for example, various forms of black particles, e.g., carbon black, activated carbon, black iron oxide, glassy carbon, silicon carbide, gray particles such as antimony, silicas, red iron oxide, and the like.

In a further aspect, the reheat additive is present in an amount of at least 0.01 wt %. In a still further aspect, the reheat additive is present in an amount of at least 0.1 wt %. In yet a further aspect, the reheat additive is present in an amount of at least 0.25 wt %. In an even further aspect, the reheat additive is present in an amount of at least 0.5 wt %.

In a further aspect, the composition further comprises an impact modifier. Suitable impact modifiers include, but are not limited to, ethylene/acrylate/glycidyl terpolymers and ethylene/acrylate copolymers in which the acrylate is a methyl or ethyl acrylate or methyl or ethyl methacrylate or the corresponding butyl acrylates, styrene based block copolymers, and various acrylic core/shell type impact modifiers.

In a further aspect, the impact modifier is present in an amount of at least 0.01 wt %. In a still further aspect, the impact modifier is present in an amount of at least 0.1 wt %. In yet a further aspect, the impact modifier is present in an amount of at least 0.25 wt %. In an even further aspect, the impact modifier is present in an amount of at least 0.5 wt %.

In various aspects, the composition may further comprise other additives. Suitable additives include, but are not limited to, harmonizers, fillers, crystallization aids, impact modifiers, surface lubricants, denesting agents, stabilizers, ultraviolet light absorbing agents, metal deactivators, nucleating agents such as polyethylene and polypropylene, phosphate stabilizers and dyestuffs.

In a further aspect, the other additive is present in an amount of at least about 0.01 wt %. In a still further aspect, the other additive is present in an amount of at least about 0.1 wt %. In yet a further aspect, the other additive is present in an amount of at least about 0.25 wt %. In an even further aspect, the other additive is present in an amount of at least about 0.5 wt %.

In many applications, not only are the packaging contents sensitive to the ingress of oxygen, but the contents may also be affected by UV light. Fruit juices and pharmaceuticals are two examples of such contents. Accordingly, in some aspects, it is desirable to incorporate into the composition a UV absorbing compound in an amount effective to protect the packaged contents.

C. Methods

As used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

It is known that the base polymers comprising the polyester compositions can be prepared by polymerization procedures known in the art sufficient to effect esterification and polycondensation. In some aspects, polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

In other aspects, the transition metal or metals may be added neat or in a carrier (such as a liquid or wax) to an extruder or other device for making the article, or the metal may be present in a concentrate or carrier with the oxidizable organic component, in a concentrate or carrier with a base polymer, or in a concentrate or carrier with a base polymer/oxidizable organic component blend. Alternatively, at least a portion of the transition metal may be added as a polymerization catalyst to the melt phase reaction for making the base polymer (a polyester polymer in some aspects) and be present as residual metals when the polymer is fed to the melting zone (e.g. the extrusion or injection molding zone) for making the article such as a preform or sheet. It is desirable that the addition of the transition metal does not substantially increase the intrinsic viscosity (It. V) of the melt in the melt processing zone. Thus, transition metal or metals may be added in two or more stages, such as once during the melt phase for the production of the polyester polymer and again once more to the melting zone for making the article.

In certain aspects, the instant compositions can be made by mixing a base polymer (PET, for example) with the at least one compound of formula (I) or (II), the at least one polydiene, and the at least one transition metal in a positive oxidation state. Such compositions can be made by any method known to those skilled in the art. In certain aspects, some or part of the transition metal may exist in the base polymer prior to mixing. This residual metal, for example, can exist from the manufacturing process of the base polymer. In some aspects, the base polymer, the at least one compound of formula (I) or the at least one polydiene, and the at least one transition metal are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some aspects, the mixing can be just prior to the melt process zone. In other aspects, one or more ingredients can be premixed in a separate step prior to bringing all of the ingredients together.

Methods of incorporating the additive into the substrate are well known. For example, if the substrate is liquid the additive can be merely mixed into the substrate. Frequently the organic substrate is in solution and the additive is added to the solution and the solvent removed. Solid organic substrates can be merely sprayed with a solution of the additive in a volatile solvent. For example, stabilized grain products result from spraying the grain with a toluene solution of the additive. In the case of rubbery polymers the additive can be added following the polymerization stage by mixing it with the final emulsion or solution polymerization mixture and then coagulating or removing solvent to recover the stabilized polymer. It can also be added at the compounding stage by merely mixing the additive with the rubbery polymer in commercial mixing equipment such as a Banbury blender. In this manner, rubbery polymers such as styrene-butadiene rubber, cispolybutadiene or isoprene polymers are blended with the antioxidant together with the other ingredients normally added such as carbon black, oil, sulfur, zinc oxide, stearic acid, vulcanization accelerators, and the like. Following mastication, the resultant mixture is fabricated and molded into a finished form and vulcanized.

In another aspect, the at least one compounds of formula (I) or (II), the at least one polydiene, and the at least one transition metal can be used as a master batch for blending with a polymer or a polymer containing component. In such compositions, the concentration of the at least one compounds of formula (I) or (II) and the at least one polydiene, and the transition metal will be higher to allow for the final blended product to have suitable amounts of these components. The master batch may also contain an amount of the polymer to which the master batch is to be blended with. In other aspects, the master batch may contain a polymer that is compatible with the polymer that the master batch is to be blended with.

In some aspects, the melt blend of the base polymer, the at least one compound of formula (I) or (II), the at least one polydiene, and the at least one transition metal can also be prepared by adding the components at the throat of an injection molding machine that: (i) produces a preform that can be stretch blow molded into the shape of the container, (ii) produces a film that can be oriented into a packaging film, (iii) produces a sheet that can be thermoformed into a food tray, or (iv) produces an injection molded container. The mixing section of the extruder should be of a design to produce a homogeneous blend. Such process steps work well for forming carbonated soft drink, water or beer bottles, packaging films, and thermoformed trays. The present invention can be employed in any of the conventional known processes for producing a polymeric container, film, tray, or other article that would benefit from oxygen scavenging.

In some aspects, the disclosure is directed to the use of the compositions described herein as a component of a wall that is used in a package for oxygen sensitive materials. In some aspects, disclosed herein is a wall of a package comprising at least one layer, wherein the layer comprises the compositions described herein.

The necessary scavenging capacity of a package will generally have to be greater for walls that have a greater permeance in the absence of scavenging additives. Accordingly, a good effect is harder to achieve with inherently higher permeance materials are used.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

In some aspects, the package walls of the disclosure can be a single layer or multilayer constructions. In some aspects using multilayer walls, the outer and inner layers may be structural layers with one or more protective layers containing the oxygen scavenging material positioned there between. In some aspects, the outer and inner layers comprise and polyolefin or a polyester. In certain aspects, a single layer design is preferred. Such a layer may have advantages in simplicity of manufacture and cost.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well known to those skilled in the art. Persons familiar with oxygen scavenging technology and products will understand how to implement the structures disclosed in this paragraph.

In some aspects, disclosed herein is a method for packaging an oxygen sensitive material comprising: (a) preparing a package having a wall comprising at least one layer, the at least one layer comprising a composition, wherein the composition comprises: i) a base polymer; ii) at least one compound of formula I or II:

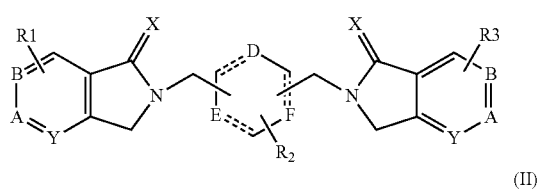

(I)

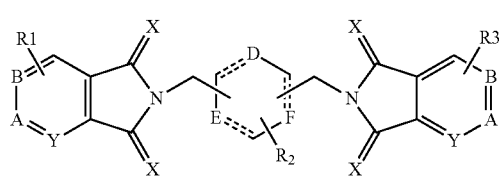

(II)

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; and iii) at least one polydiene compound; and iv) at least one transition metal in a positive oxidation state, wherein the composition is substantially free of a compatibilizer.

In yet other aspects, disclosed herein is a process for making an article comprising: (a) forming a melt by combining in a melt processing zone: a base polymer; at least one compound of formula I or II:

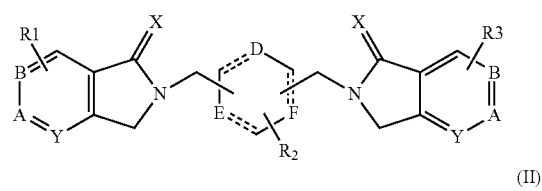

(I)

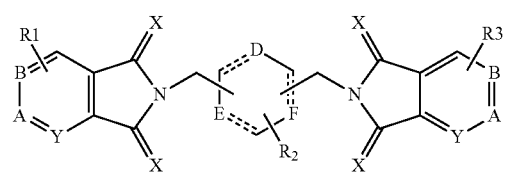

(II)

wherein X is selected from the group consisting of O, S and NH; Y, A and B are independently selected from the group consisting of N and CH; D, E and F are independently selected from the group consisting of CH, N, O and S; the symbol ----- when used in conjunction with a bond line represents a single or a double bond; and $R_1$, $R_2$ and $R_3$ are independently selected from the group consisting of H, electron withdrawing groups and electron releasing groups and a transition metal; and at least one polydiene compound; and at least one transition metal in a positive oxidation state, and wherein the composition is substantially free of a compatibilizer; and (b) forming an article from said melt.

Among the techniques that can be used to make articles are moulding generally, injection moulding, stretch blow moulding, extrusion, thermoforming, extrusion blow moulding, and (specifically for multilayer structures) co-extrusion and lamination using adhesive tie layers. Orientation, e.g. by stretch blow moulding, of the polymer is especially attractive with phthalate polyesters because of the known mechanical advantages that result.

The melt processing zone for making the article can be operated under customary conditions effective for making the intended articles, such as preforms, bottles, trays, and other articles mentioned below. In one aspect, such conditions are effective to process the melt without substantially increasing the It. V. of the melt and which are ineffective to promote transesterification reactions. In some preferred aspects, suitable operating conditions effective to establish a physical blend of the polyester polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig to about 900 psig. In some aspects, the residence time of the melt on the screw can range from about 1 to about 4 minutes.

D. Articles

The oxygen scavenger composition described herein can be incorporated in packaging articles having various forms. Various articles can be prepared from the disclosed compositions. Thus, the articles prepared from the compositions will also have the polymer present in the article. Suitable articles include vessels and films, such as flexible sheet films, flexible bags, pouches, semi-rigid and rigid containers such as bottles (e.g., PET bottles) or metal cans, or combinations thereof. Typical flexible films and bags include those used to package various food items and can be made up of one or a multiplicity of layers to form the overall film or bag-like packaging material. The composition described herein can be used in one, some or all of the layers of such packaging material.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (e.g., vitamin degradation), or color of the drink. The compositions are also particularly useful as a sheet for thermoforming into rigid packages and films for flexible structures. Rigid packages include food trays and lids. Examples of food tray applications include dual oven-able food trays, or cold storage food trays, both in the base container and in the lidding (whether a thermoformed lid or a film), where the freshness of the food contents can decay with the ingress of oxygen. The compositions can also be used in the manufacture of cosmetic containers and containers for pharmaceuticals or medical devices.

Other suitable articles include rigid or semi-rigid articles including plastic, such as those utilized for juices, soft drinks, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket. The composition described herein can be used as an integral layer or portion of, or as an external or internal coating or liner of, the formed semi-rigid or rigid packaging article. As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

Oxygen permeability of an article can be maintained for a longer period of time by storing the article in a sealed container or under an inert atmosphere such as nitrogen prior to use with oxygen sensitive materials.

Although it may be preferable from the standpoint of packaging convenience and/or scavenging effectiveness to employ the present invention as an integral or discrete part of the packaging wall, the invention can also be used as a non-integral component of a packaging article such as, for example, a bottle cap liner, adhesive or non-adhesive sheet insert, sealant, sachet, fibrous mat insert or the like.

In another aspect, the article can be a package, whether rigid, semi-rigid, collapsible, lidded, or flexible or a combination of these, comprising a wall as formed from the compositions described herein. Such packages can be formed by methods well known to those skilled in the art. In a further aspect, the article is formed as a bottle or a film.

In yet other aspect, disclosed herein is a container from a film-forming polymer, having at least one wall comprising an effective amount of an oxygen-scavenging composition comprising at least one compound of formula (I) or (II) as described, at least one polydiene, and wherein the composition is substantially free of a compatibilizer.

In a further aspect, the disclosed composition or an article made therefrom can have an Oxygen Transmission Rate (OTR) of less than about 0.1 (units of cc/pkg/day or 1-5 cc-mm/m$^g$-day-atm) under standard conditions. In a further aspect, the OTR can be less than 0.03, less than 0.01, less than 0.005, or less than 0.001. The OTR is a measure of how well the oxygen scavenger compound functions at scavenging oxygen that permeates the composition or article.

When OTR is expressed for a given composition or article, the units "cc/package/day" ("cc/pkg/day") are typically employed. The term package refers to a barrier between an atmosphere of relatively lower oxygen content and an atmosphere of relatively higher oxygen content. Typical barriers (e.g., packages) include bottles, thermoformed containers, and films (e.g., shrink wrap).

Oxygen Transmission Rate (oxygen permeation) can be measured, for example, as described in U.S. Pat. No. 5,021,515. A material of area A can be exposed to a partial pressure p of oxygen on the one side and to an essentially zero partial pressure of oxygen on the other side. The quantity of oxygen emerging on the latter side is measured and expressed as a volume rate dV/dt, the volume being converted to some standard condition of temperature and pressure. After a certain time of exposure (usually a period of a few days) dV/dt is generally found to stabilize, and a $P_W$ value can be calculated from equation below:

$$dV/dt = P_W A p \qquad (1)$$

$P_W$ refers to the permeance of the wall. (Analogy with magnetic permeance and electrical conductance would suggest that $P_W$ should be described as "permeance per unit area", but we are following the nomenclature in Encyclopedia of Polymer Science and Technology, Vol. 2, Wiley Interscience, 1985, page 178.) The standard conditions for expressing dV/dt are 0° C. and 1 atm (1 atm=101 325 Nm$^{-2}$). If the thickness of the area of wall is substantially constant over the area A with value T and the wall is uniform through the thickness (i.e., the wall is not a laminated or coated one) then the permeability of the material in the direction normal to the wall is calculated from the equation below.

$$dV/dt = P_M A p / T \qquad (2)$$

For non-scavenging materials, $P_W$ and $P_M$ are to a reasonable approximation independent of t and p, and $P_M$ of T although they are often appreciably dependent on other conditions of the measurement such as the humidity of the atmosphere on the oxygen-rich side and the temperature of the measurement.

For oxygen-scavenging walls, $P_W$ and $P_M$ are functions oft because the concentrations and activity of scavenger vary with time (particularly as the scavenger is consumed). This typically does not prevent measurement of $P_W$ and $P_M$ reasonably accurately as a function of time, because the changes in dV/dt are relatively gradual once the normal initial equilibration period of a few days is over. After a few days' exposure to the measurement conditions, however, a non-scavenging material typically achieves a steady state in which dV/dt is equal to the rate of oxygen ingress to the wall, while a scavenging material achieves an (almost) steady state in which dV/dt is considerably less than the rate of oxygen ingress to the material. This being the case, it is likely that $P_W$ calculated from (1) is a function of p as well as oft and that $P_M$ in (2) is a function of p and T as well as oft. $P_W$ and $P_M$ for scavenging materials are, strictly speaking, not true permeances and permeabilities at all (since permeation and scavenging are occurring simultaneously) but, rather, apparent ones.

Values of $P_W$ and $P_M$ (except where stated otherwise) are to be understood to refer to conditions in which p=0.21 atm, the relative humidity on the oxygen-rich side of the wall is 50%, the temperature is 23° C. and (in the case of $P_M$ values) the thickness of the material of about 0.45 mm. Conditions close to the first three of these, at least, are conventional in the packaging industry.

For example, OTR can be measured for bottles, for example, by controlling the atmosphere on both sides of a sample of bottles and measuring the rate of oxygen permeation over time. Typically, the bottles are mounted on a plate such that there are two ports for gas inlet and outlet. The interior of the bottles is separated from the exterior by an air tight seal. After sealing, the interior of the bottle is flushed with $N_2$ gas (or $N_2+H_2$ mixture) to remove any oxygen present before mounting on plate. The bottle is then placed in a controlled environmental chamber (maintained at 23° C. and 50% RH) such that the exterior of the bottle is at standard atmosphere with ~21% oxygen. The interior of the bottle is continuously flushed with $N_2$ (or $N_2+H_2$) at a known gas flow rate. The outlet of the flushed gases contains oxygen permeating through the bottle wall. This flushed gas from the bottle interior is passed over a sensor that is calibrated to measure oxygen content of the flushed gas. Such measurements of oxygen content are made continuously over time until a steady state is reached. This steady state value is typically reported as Oxygen Transmission Rate (OTR) for that bottle in the units of cc/package/day. A preferred OTR for PET bottles is less than 0.1 cc/package/day; more preferred is less than 0.01 cc/package/day; most preferred for PET bottles is less than 0.001 cc/package/day over the shelf life of the packaged product.

In various aspects, the oxygen scavenging composition has an OTR of less than that of an otherwise identical composition in the absence of the at least one compound of formula (I) or (II), at least one polydiene and the transition metal. In a further aspect, the oxygen scavenging composition has an OTR of less than about 75% of an otherwise identical composition in of the at least one compound of formula (I) or (II), at least one polydiene and the transition metal. In a still further aspect, the oxygen scavenging composition has an OTR of less than about 50% of an otherwise identical composition in the absence of of the at least one compound of formula (I) or (II), at least one polydiene and the transition metal. In yet a further aspect, the oxygen scavenging composition has an OTR of less than about 25% of an otherwise identical composition in of the at least one compound of formula (I) or (II), at least one polydiene and the transition metal. In an even further aspect, the oxygen scavenging composition has an OTR of less than about 20% of an otherwise identical composition in of the at least one compound of formula (I) or (II), at least one polydiene and the transition metal. In a still further aspect, the oxygen scavenging composition has an OTR of less than about 10% of an otherwise identical composition in of the at least one compound of formula (I) or (II), at least one polydiene and the transition metal. In yet a further aspect, the oxygen scavenging composition has an OTR of less than about 5% of an otherwise identical composition in of the at least one compound of formula (I) or (II), at least one polydiene and the transition metal. In an even further aspect, the oxygen scavenging composition has an OTR of less than about 1% of an otherwise identical composition in of the at least one compound of formula (I) or (II), at least one polydiene and the transition metal.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising:
a) a polyester polymer;
b) a compound of formula I or II:

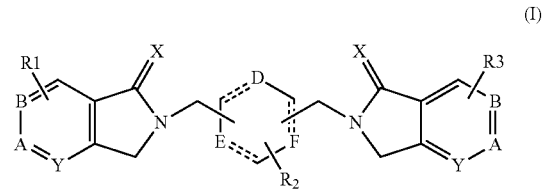

(I)

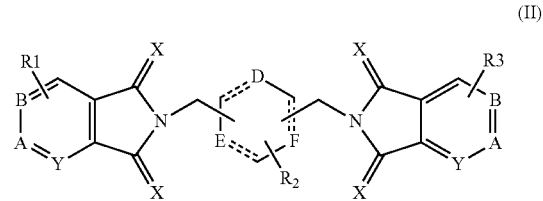

(II)

wherein
X is selected from the group consisting of O, S, and NH;
Y, A and B are independently selected from the group consisting of N and CH;
D, E and F are independently selected from the group consisting of CH, N, O, and S;
the symbol ----- when used in conjunction with a bond line represents a single or a double bond; and
$R_1$, $R_2$, and $R_3$ are independently selected from the group consisting of H, —$NH_2$, —$NO_2$, —CN, methyl, ethyl, propyl, isopropyl, butyl, isobutyl, tert-butyl, —$CO_2H$, and —$CO_2$(C1-C6 alkyl),
wherein the compound is present in an amount of from about 0.1% to about 10% by weight of the composition;

c) an un-functionalized polydiene present in an amount of from about 0.01% to about 10% by weight relative to the compound of formula (I) or (II), wherein the un-functionalized polydiene is selected from 1,4-polybutadiene, 1,2-polybutadiene, 1,4-polyisoprene, 3,4-polyisoprene, poly 2,3-dimethyl butadiene, and poly 1,6-hexatriene, or a combination thereof; and d) a transition metal in a positive oxidation state, wherein the transition metal is present in an amount of from about 10 ppm to about 500 ppm, wherein the composition is substantially free of a compatibilizer.

2. The composition of claim 1, wherein the compound is (III)

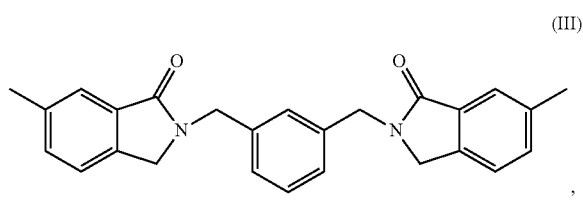

, (IV)

, (V)

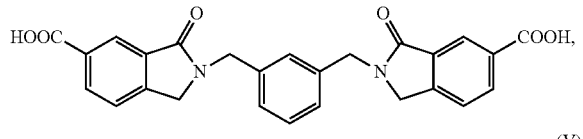

, (VI)

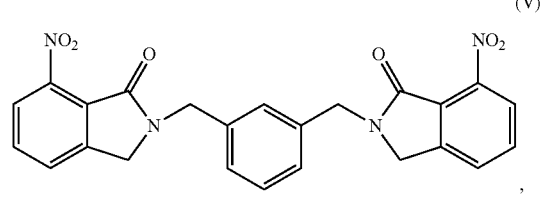

, or (VII)

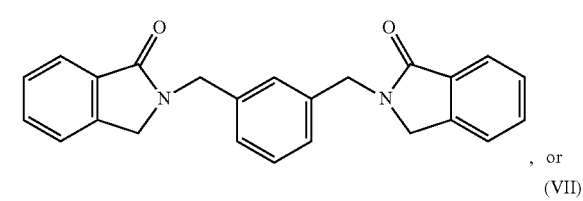

.

3. The composition of claim 1, wherein the un-functionalized polydiene has the number average molecular weight of from about 500 to about 10,000.

4. The composition of claim 1, wherein the un-functionalized polydiene comprises a plurality of particles with a particle size of from about 10 nm to about 1,000 nm.

5. The composition of claim 1, wherein the transition metal is cobalt.

6. The composition of claim 1, wherein the polyester polymer is polyethylene terephthalate.

7. A wall of package comprising at least one layer, wherein the layer comprises the composition of claim 1.

8. The composition of claim 1, wherein the compound is of formula:

(I)

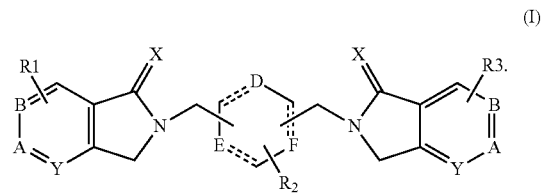

9. The composition of claim 1, wherein the compound has a structure represented by a formula:

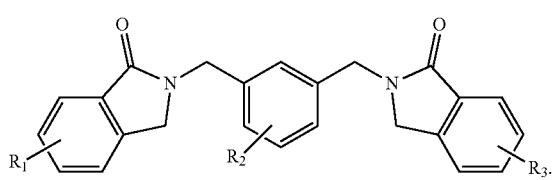

10. The composition of claim 1, wherein the compound is:

(VI)

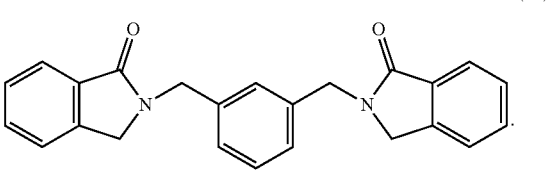

.

11. The composition of claim 1, wherein the composition has an induction period that is less than the induction period of the same composition in the absence of the compound or in the absence of the un-functionalized polydiene.

12. The composition of claim 11, wherein the composition has no measurable induction period.

13. A composition comprising:
a) polyethylene terephthalate;
b) a compound selected from:

(III)

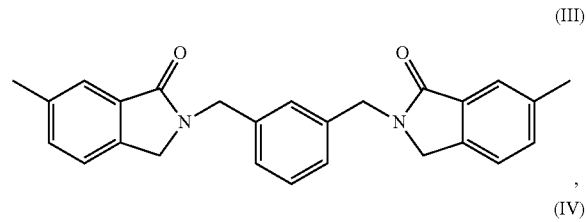

, (IV)

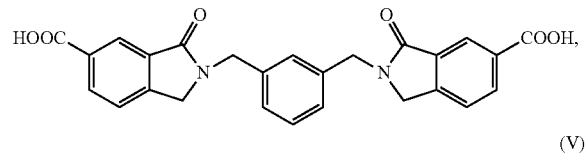

, (V)

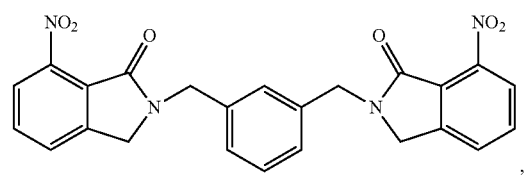

,

-continued

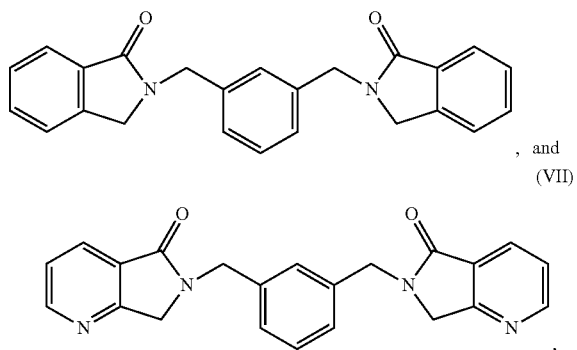

(VI)

, and (VII)

wherein the compound is present in an amount of from about 0.1% to about 10% by weight of the composition;

c) an un-functionalized polydiene selected from 1,4-polybutadiene, 1,2-polybutadiene, 1,4-polyisoprene, 3,4-polyisoprene, poly 2,3-dimethyl butadiene, and poly 1,6-hexatriene, or a combination thereof, wherein the un-functionalized polydiene is present in an amount of from about 0.01% to about 10% by weight relative to the compound; and d) cobalt present in an amount of from about 10 ppm to about 500 ppm, wherein the composition is substantially free of a compatibilizer.

14. The composition of claim 13, wherein the compound is:

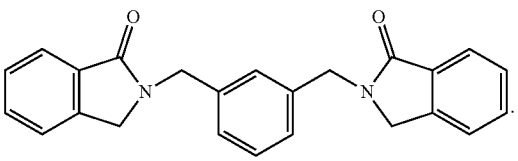

(VI)

15. The composition of claim 13, wherein the composition has no measurable induction period.

16. The composition of claim 13, wherein the un-functionalized polydiene is 1,4-polybutadiene or 1,2-polybutadiene.

17. The composition of claim 13, wherein the un-functionalized polydiene has the number average molecular weight of from about 500 to about 10,000.

18. The composition of claim 13, wherein the un-functionalized polydiene comprises a plurality of particles with a particle size of from about 10 nm to about 1,000 nm.

19. The composition of claim 13, wherein the composition has an induction period that is less than the induction period of the same composition in the absence of the compound or in the absence of the un-functionalized polydiene.

20. A wall of package comprising at least one layer, wherein the layer comprises the composition of claim 13.

* * * * *